United States Patent
Azizi et al.

(10) Patent No.: US 6,329,069 B1
(45) Date of Patent: *Dec. 11, 2001

(54) COMPOSITE STRUCTURE AND DEVICES MADE FROM SAME AND METHOD

(75) Inventors: Gholam Reza Zadno Azizi, Newark; Raj Subramaniam, Fremont; Mir A. Imran, Los Altos Hills; Jeffrey W. Simpson, Mountain View, all of CA (US)

(73) Assignee: Surface Genesis, Inc., Menlo Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/900,088

(22) Filed: Jul. 24, 1997

Related U.S. Application Data

(60) Continuation-in-part of application No. 08/767,631, filed on Dec. 17, 1996, now Pat. No. 5,772,105, which is a division of application No. 08/507,752, filed on Jul. 26, 1995, now Pat. No. 5,611,874.

(51) Int. Cl.[7] ............................. B32B 15/02; A61B 1/00; A61M 25/00

(52) U.S. Cl. .................. 428/600; 428/607; 428/685; 428/660; 600/434; 600/585

(58) Field of Search .................. 428/607, 608, 428/614, 685, 680, 660, 672, 600; 600/585, 434

(56) References Cited

U.S. PATENT DOCUMENTS

| | | | |
|---|---|---|---|
| 1,125,161 | * 1/1915 | Page | 428/614 |
| 1,984,083 | 12/1934 | Riemenschneider | 228/147 |
| 2,054,939 | 9/1936 | Larson | 228/151 |
| 2,300,850 | 11/1942 | Wolcott | 228/151 |
| 3,698,863 | * 10/1972 | Roberts et al. | 428/685 |
| 3,905,839 | * 9/1975 | Hashimoto | 428/930 |
| 4,035,007 | 7/1977 | Harrison et al. | 428/960 |
| 4,472,035 | * 9/1984 | Takamura et al. | 351/41 |
| 4,518,444 | 5/1985 | Albrecht et al. | 148/402 |
| 4,637,962 | * 1/1987 | Albrecht et al. | 428/616 |
| 4,797,510 | * 1/1989 | Mihelich | 174/94 R |
| 4,808,246 | 2/1989 | Albrecht et al. | 148/563 |
| 4,957,343 | * 9/1990 | Sato et al. | 350/96.21 |
| 5,069,226 | * 12/1991 | Yamauchi et al. | 128/772 |
| 5,213,111 | 5/1993 | Cook et al. | 128/772 |
| 5,242,002 | 9/1993 | Oku | 148/402 |
| 5,272,486 | 12/1993 | Dickinson | 343/719 |
| 5,276,455 | 1/1994 | Fitzsimmons et al. | 343/777 |
| 5,364,706 | * 11/1994 | Toyofuku et al. | 428/607 |
| 5,368,661 | 11/1994 | Nakamura et al. | 148/512 |
| 5,611,874 | * 3/1997 | Zadno-Azizi et al. | 148/402 |
| 5,628,787 | * 5/1997 | Mayer | 623/1 |
| 5,817,978 | * 10/1998 | Hermant et al. | 174/75 C |
| 5,858,556 | * 1/1999 | Eckert et al. | 428/586 |

FOREIGN PATENT DOCUMENTS

| | | | |
|---|---|---|---|
| 3019958 | 7/1976 | (JP) | 228/131 |
| 3161181 | 11/1989 | (JP) . | |

* cited by examiner

*Primary Examiner*—John J. Zimmerman
(74) *Attorney, Agent, or Firm*—Flehr Hohbach Test Albritton & Herbert LLP

(57) ABSTRACT

A composite structure comprising a body having a surface and cladding covering at least a part of said surface of the body and being in intimate contact with the surface. The body and cladding are formed of different materials.

17 Claims, 7 Drawing Sheets

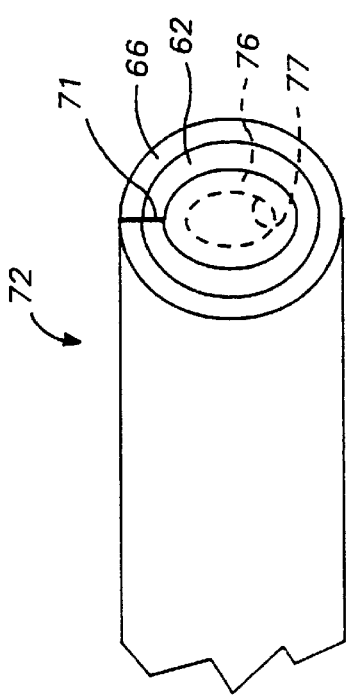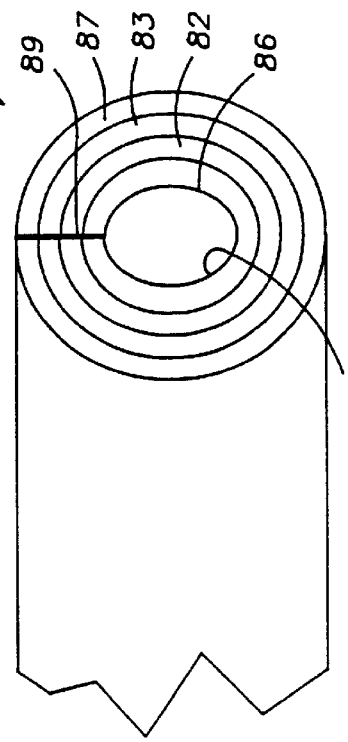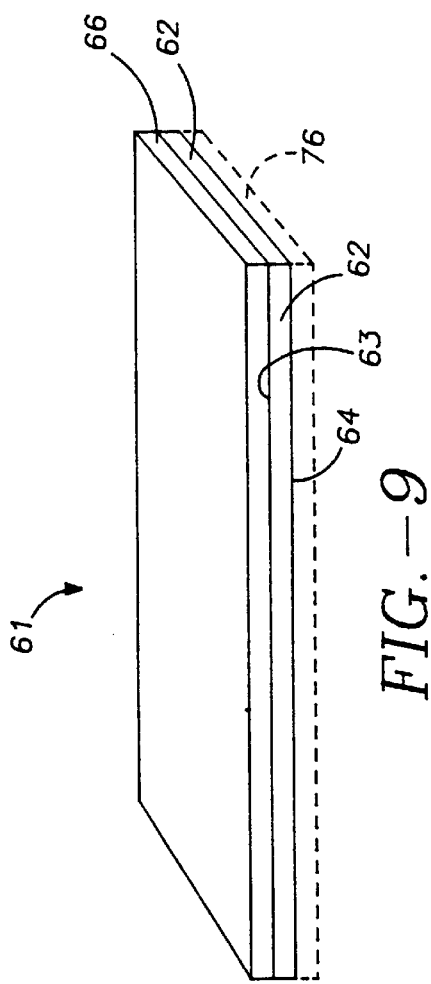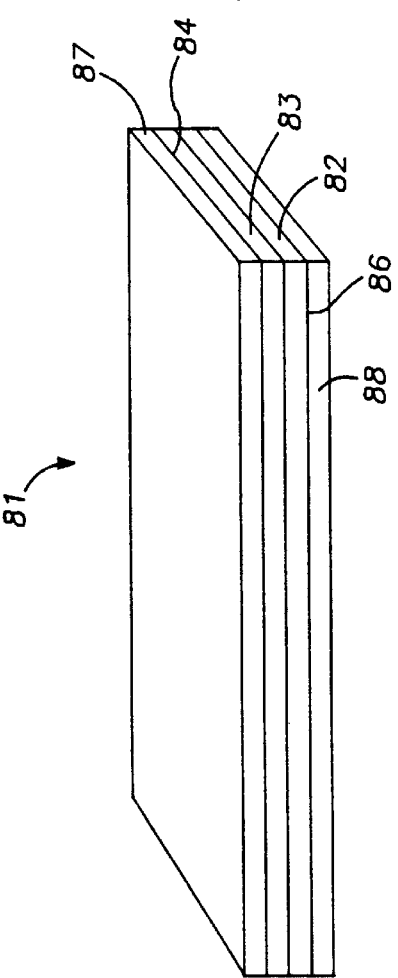

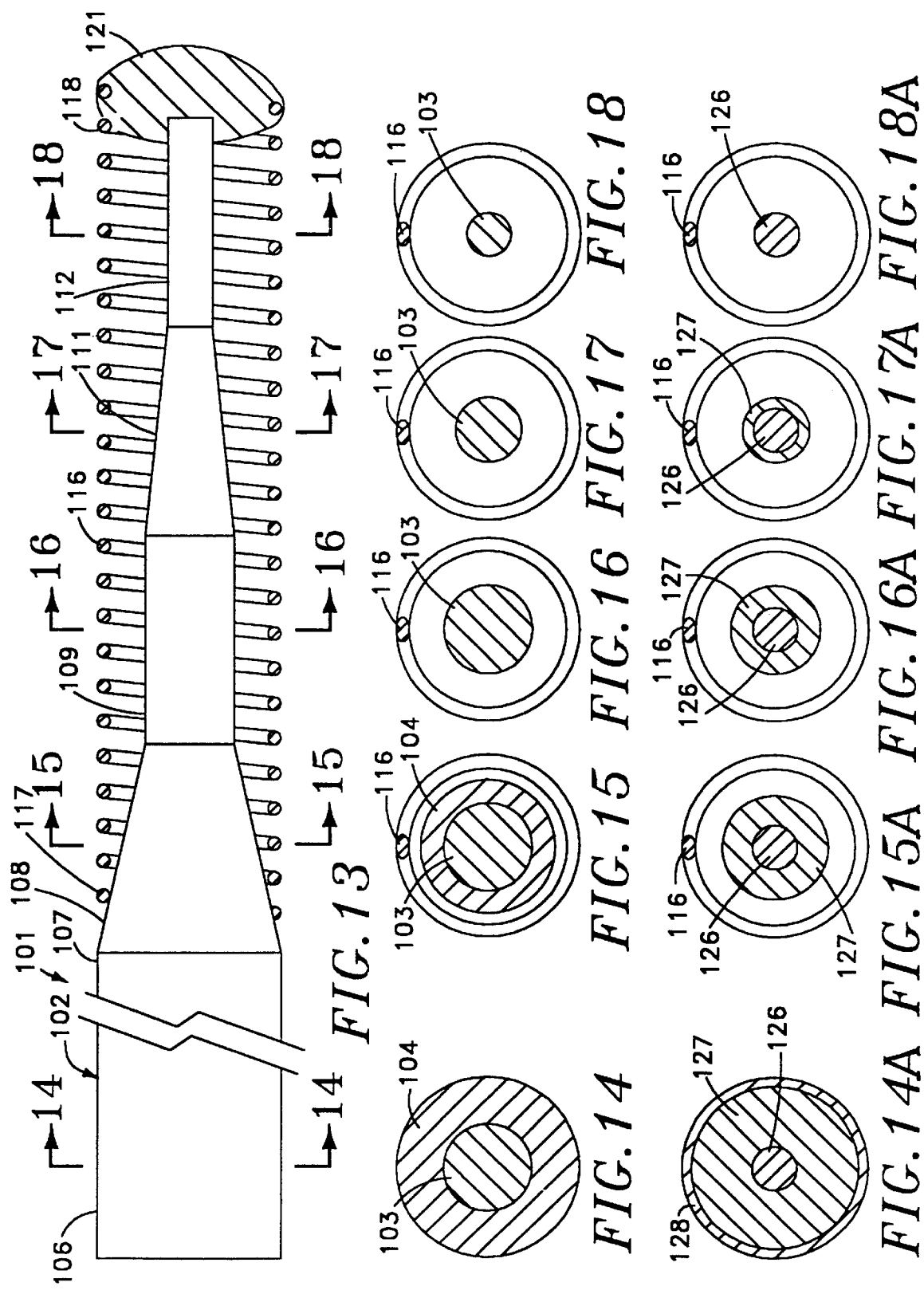

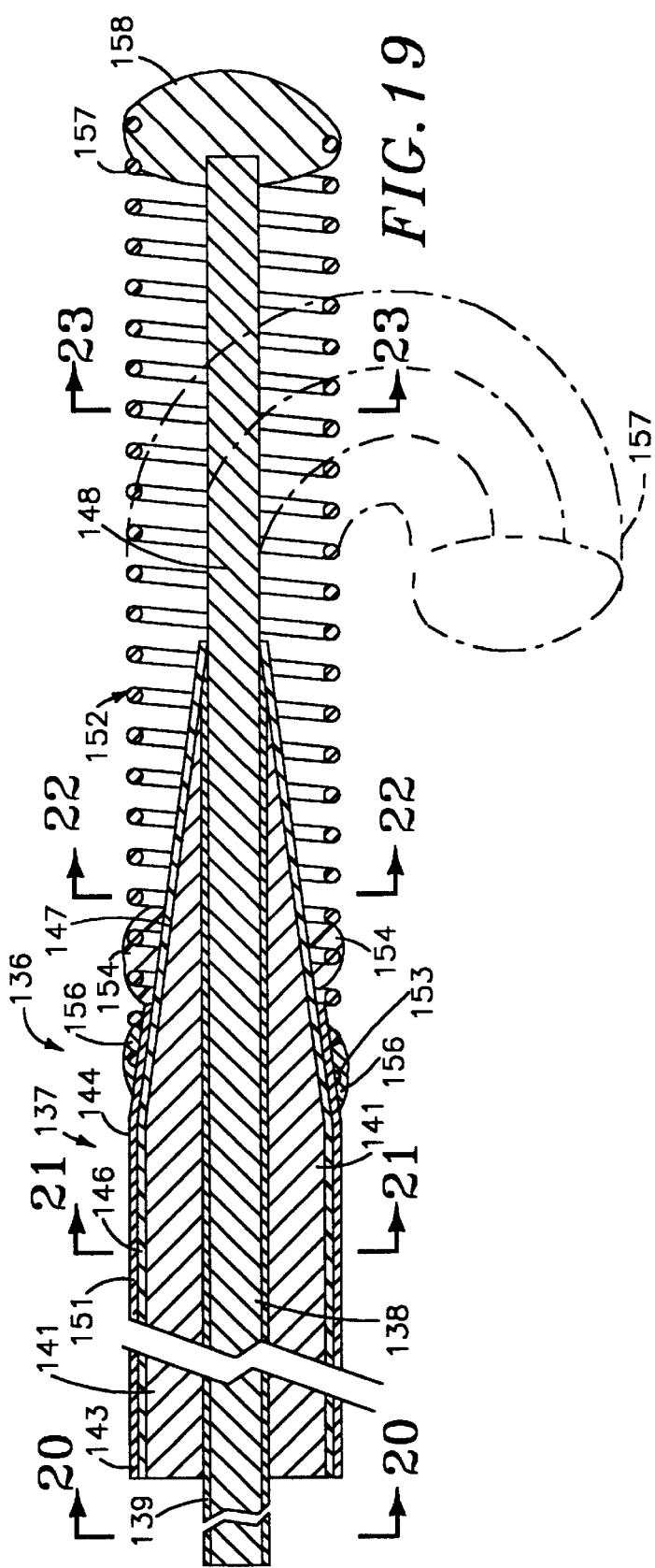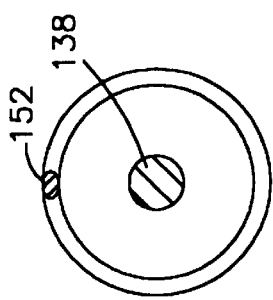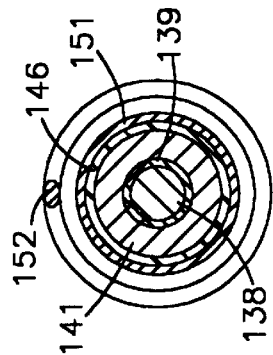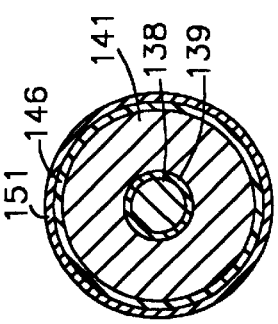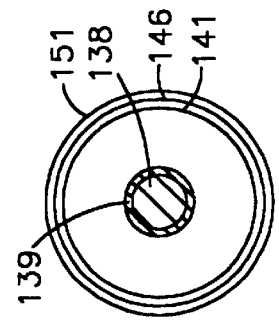

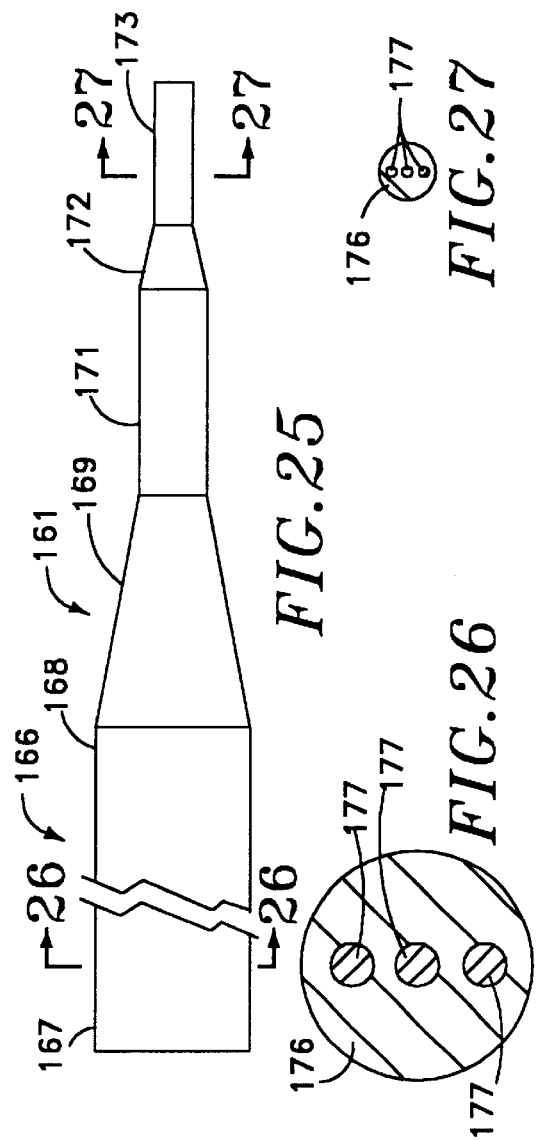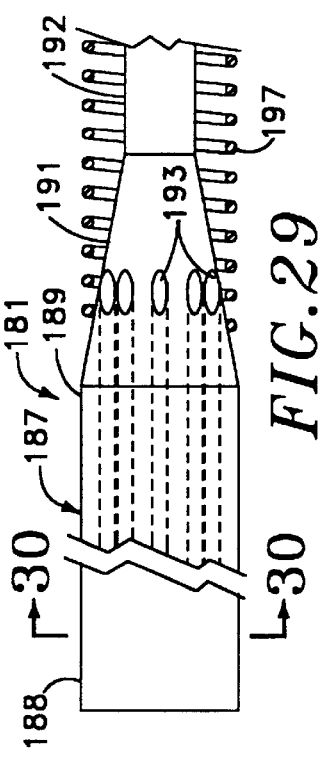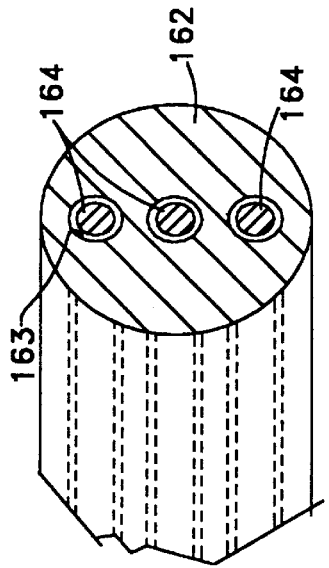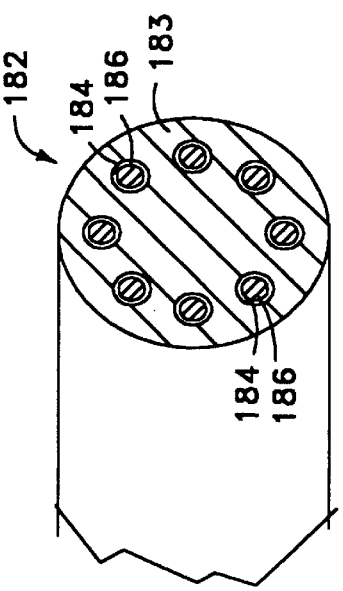

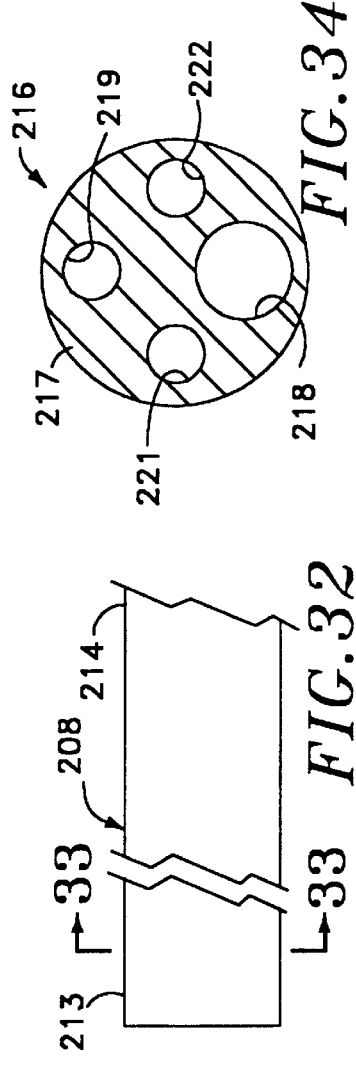

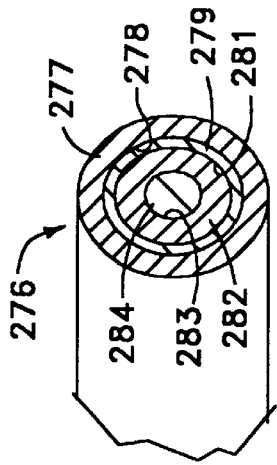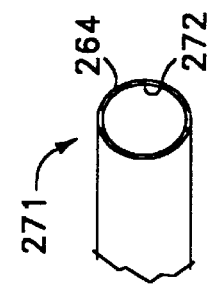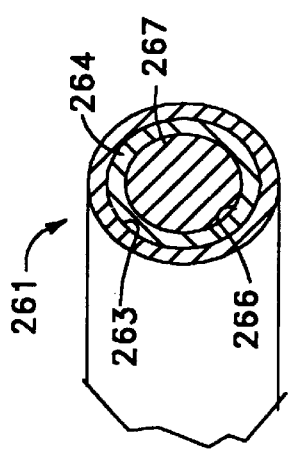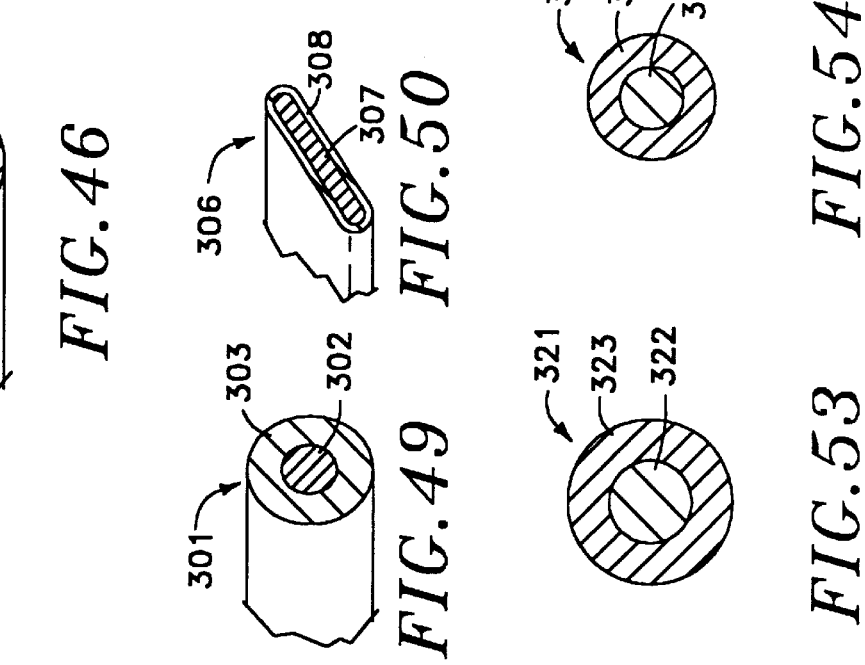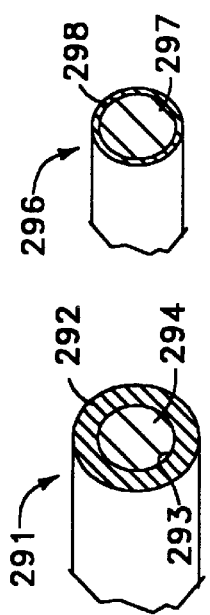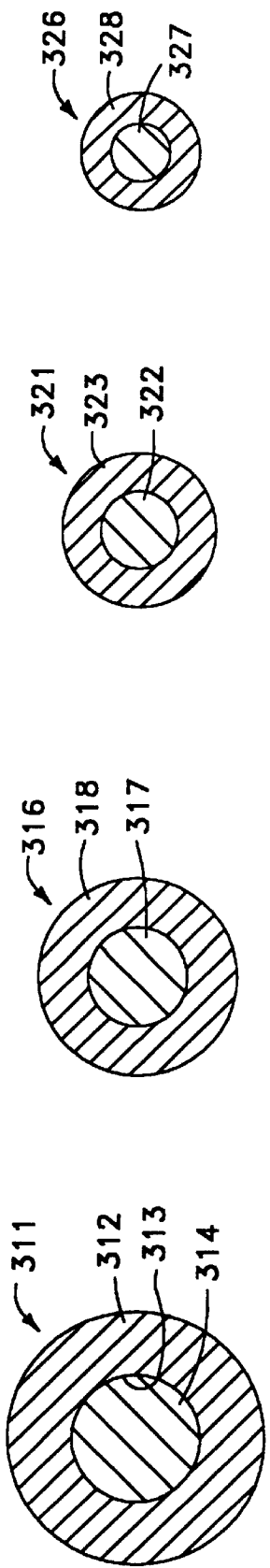

COMPOSITE STRUCTURE AND DEVICES MADE FROM SAME AND METHOD

This application is a continuation-in-part of application Ser. No. 08/767,631 filed Dec. 17, 1996, now U.S. Pat. No. 5,772,105 which is a division of application Ser. No. 08/507,752 filed on Jul. 26, 1995 now U.S. Pat. No. 5,611,874.

This invention relates to a composite structure and devices made from the same and method.

Shape memory alloy wire and sheets heretofore have been made. However, forming the wire and sheets from shape memory alloy ingots has been difficult and expensive. For example, in making wire from a nickel titanium alloy and starting with a bar of the nickel titanium alloy, the wire is generally drawn to a final size by a series of draw passes and interpass anneals. Ordinarily, the wire is completely annealed by an interpass anneal and the wire is drawn until it becomes too brittle to draw further, after which the wire is subjected to another interpass anneal followed by another draw. This procedure is continued until the final size wire is achieved. The final properties of the wire are greatly dependent on the amount of reduction after the last interpass anneal, commonly referred to as a mount of cold work. Nickel titanium alloys are generally cold worked to around 40% to achieve the optimum super-elastic or shape memory effect. Stainless steel wire, on the other hand, is generally cold worked to 90% to achieve the optimum strength and elasticity. These differences in cold working characteristics of these two materials as well as other materials leads to processing complications when such two materials are made into a composite structure. There is therefore a need for a solution to this problem. In addition, since such shape memory alloy materials are generally very abrasive, there is extensive wear on the dies during the drawing process. The use of such shape memory alloys also has been limited because of the poor conductivity of such shape memory alloys. In addition, the welding and joining of such shape memory alloys has been difficult because of its inter-metallic structure. Attempts have been made to plate such shape memory alloys to improve their soldering capabilities and also to improve the conductivity. Such plating has been generally relatively unsuccessful because the adhesion of such plating materials to the shape memory alloy is less than optimum. For that reason, when the shape memory alloys are subject to deformation, the plating has a tendency to flake off. There is therefore a need for a composite structure and method to overcome these difficulties.

In general, it is an object of the present invention to provide a composite structure and method incorporating the present invention.

Another object of the invention is to provide a composite structure and method of the above character in which at least one shape memory alloy is used.

Another object of the invention is to provide a composite structure and method of the above character in which one of the components is a high strength material.

Another object of the invention is to provide a composite structure and method of the above character in which cold working of the materials can be achieved.

Another object of the invention is to provide a composite structure and method of the above character in which different degrees of cold working can be achieved by utilizing appropriate annealing temperatures.

Another object of the invention is to provide improved radiopacity.

Another object of the invention is to provide a composite structure and method of the above character in which superelastic and actuator shape memory alloys are used.

Another object of the invention is to provide a composite structure and method of the above character which can be readily formed and shaped minimizing die wear.

Another object of the invention is to provide a composite structure and method of the above character which has improved conductivity.

Another object of the invention is to provide a composite structure and method of the above character which has improved weldability and solderability.

Another object of the invention is to provide a composite structure and method of the above character which can incorporate shape memory alloys having superelastic and/or actuator capabilities.

Another object of the invention is to provide a composite structure and method of the above character which can be utilized in the fabrication of many different types of devices.

Another object of the invention is to provide a composite structure and method of the above character which is particularly suitable for making mandrels for guide wires.

Another object of the invention is to provide a composite structure and method of the above character which is particularly useful for making guide wires having electrical characteristics.

Another object of the invention is to provide a composite structure and method of the above character which can be utilized for providing a device having a preferential bending plane.

Another object of the invention is to provide a composite structure and method of the above character which has improved torsion capabilities.

Another object of the invention is to provide a composite structure and method of the above character which can be utilized for forming multiple lumens and tubular members.

Another object of the invention is to provide a composite structure and method of the above character in which sheets and tubes all of nickel titanium alloys can be provided which have smooth surfaces.

Another object of the invention is to provide a composite structure and method of the above character which can be utilized for providing wire and ribbons having increased radiopacity for use in flexible coils carried by the distal extremities of guide wires.

BRIEF DESCRIPTION OF THE DRAWINGS

Additional objects and features of the invention will appear from the following description which the preferred embodiments are set forth in conjunction with the accompanying drawings.

FIG. 9 is an isometric view of a sheet assembly forming a composite structure in which one of the sheets is formed of a shape memory alloy having a surface and which the surface is covered by a sheet of cladding material.

FIG. 10 is a cross-sectional view showing the sheet assembly material in FIG. 9 after it has been drawn down and thereafter slit to width and cut to length and rolled into a cylinder and welded longitudinally to form an elongate tubular member such as a hypotube.

FIG. 11 is an isometric view of a sheet assembly formed of sheet materials which includes two different shape memory alloys and which are clad on both sides by sheets of cladding.

FIG. 12 is a cross-sectional view of an elongate tubular member formed from a composite sheet structure formed by drawing down the assembly shown in FIG. 11 and then rolled and welded longitudinally.

FIG. 13 is a side elevational view of a guide wire incorporating the present invention.

FIG. 14 is a cross-sectional view taken along the line 14—14 of FIG. 13.

FIG. 15 is a cross-sectional view taken along the line 15—15 of FIG. 13.

FIG. 16 is a cross-sectional view taken along the line 16—16 of FIG. 13.

FIG. 17 is a cross-sectional view taken along the line 17—17 of FIG. 13.

FIG. 18 is a cross-sectional view taken along the line 18—18 of FIG. 13.

FIGS. 14A, 15A, 16A, 17A and 18A are cross-sectional views corresponding to the views 14, 15, 16, 17 and 18 showing another embodiment of the invention shown in FIG. 13.

FIG. 19 is a side-elevational view of another embodiment of a guide wire incorporating the present invention.

FIG. 20 is a cross-sectional view taken along the line 20—20 of FIG. 19.

FIG. 21 is a cross-sectional view taken along the line 21—21 of FIG. 19.

FIG. 22 is a cross-sectional view taken along the line 22—22 of FIG. 19.

FIG. 23 is a cross-sectional view taken along the line 23—23 of FIG. 19.

FIG. 24 is a isometric view of a bar utilized for manufacturing a composite guide wire.

FIG. 25 is a side elevational view of a composite guide wire incorporating the present invention.

FIG. 26 is a cross-sectional view taken along the line 26—26 of FIG. 25.

FIG. 27 is a cross-sectional view taken along the line 27—27 of FIG. 25.

FIG. 28 is an isometric view of a cylindrical bar utilized for making another embodiment of the invention.

FIG. 29 is a side elevational view of a portion of a guide wire incorporating the present invention.

FIG. 30 is a cross-sectional view taken along the line 30—30 of FIG. 29.

FIG. 31 is an isometric view of a cylindrical bar utilized for making torque tubes.

FIG. 32 is the side elevational view of a torque tube incorporating the present invention.

FIG. 33 is a cross-sectional view taken along the line 33—33 of FIG. 32.

FIG. 34 is a cross-sectional view of a multi-lumen tubular member incorporating the present invention.

FIG. 35 is an isometric view of another composite structure incorporating the present invention which is to be utilized for making sheet stock.

FIG. 36 is an isometric view showing a composite structure which has been formed by rolling from the composite structure shown in FIG. 35.

FIG. 37 is an isometric view of a sheet material which has been provided from the composite structure shown in FIG. 36 in which the sacrificial material has been removed.

FIGS. 38, 39 and 40 are isometric views similar to the views shown in FIGS. 35, 36 and 37 showing the manner in which composite structures incorporating the present invention can be utilized for making clad sheet material.

FIGS. 41, 42 and 43 are isometric views showing the manner in which sheet materials can be made from composite structures in the form of bars which have been rolled.

FIG. 44 is an isometric view of a composite structure utilized for making thin walled short tubes.

FIG. 45 is an isometric view of a thin wall tube made from the composite structure shown in FIG. 44.

FIG. 46 is an isometric view showing another composite structure from which thin wall short tubes can be made.

FIG. 47 is an isometric view of a composite structure which can be utilized for making wire for use in making radiopaque coils.

FIG. 48 is an isometric view of radiopaque wire made from the composite structure shown in FIG. 47.

FIG. 49 is an isometric view showing a composite structure which is also utilized for making radiopaque coils for use on guide wires.

FIG. 50 is an isometric view of a composite ribbon wire utilized for making radiopaque coils.

FIG. 51 is a cross-sectional view of a composite structure which includes a nickel titanium alloy and a high strength material.

FIGS. 52, 53 and 54 are cross-sectional views similar to that shown in FIG. 1 but showing reductions in cross-sectional area after successive 40% reductions.

DETAILED DESCRIPTION OF THE INVENTION

Figure 1:
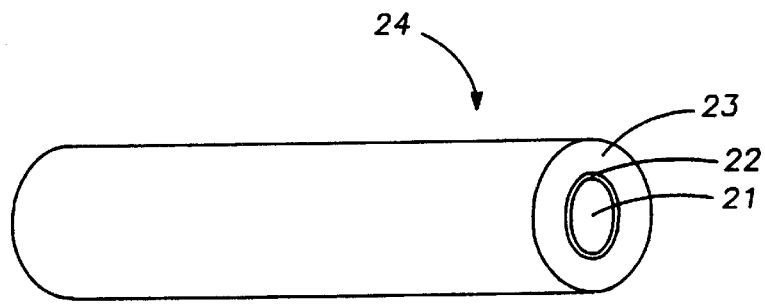
FIG. 1 is an isometric view of an assembly which can be drawn down to form a composite structure which incorporates the shape memory alloy and which is ready to be drawn down into a wire formed of a composite structure incorporating the present invention.
Figure 2:
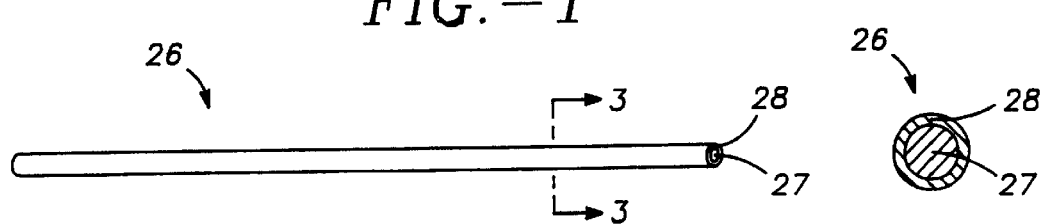
FIG. 2 is isometric view of a wire formed from drawing down of the composite assembly shown in FIG. 1.
Figure 3:
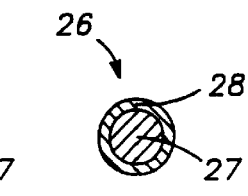
FIG. 3 is an enlarged cross-sectional view taken along the line 3—3 of FIG. 2.
Figure 4:
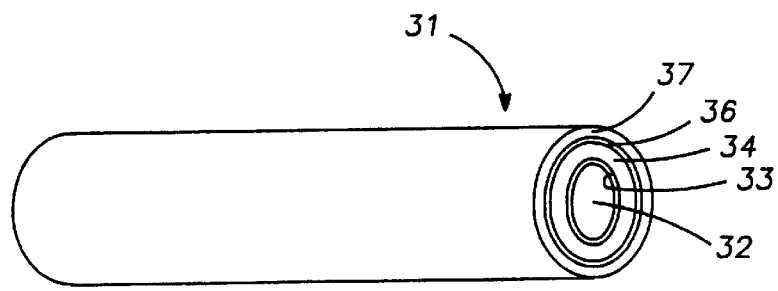
FIG. 4 is an isometric view of an assembly of two different shape memory alloys, one of which may be superelastic alloy and the other which may be an actuator alloy and a cladding material.

In general, the composite structure of the present invention is comprised of a body having a surface and cladding covering at least a part of said surface and being in intimate contact with the surface. The body and the cladding are formed of different materials.

The characteristics of shape memory alloys utilizable in the present invention are described in a book entitled "Engineering Aspects of Shape Memory Alloys" by T. W. Duerig, K. N. Melton, D. Stockel and C. M. Wayman and published in 1990 by Butterworth-Heineman, Ltd. In connection with the present invention, shape memory alloys exhibiting superelastic capabilities and those alloys exhibiting actuator or work production capabilities are considered. The superelastic characteristics are isothermal in nature and involve the storage of potential energy. The actuator or work production applications involve motion against stress. Superelastic shape memory alloys can be deformed as much as ten times more than a conventional metal and still completely spring back to their original undeformed shapes. The superelasticity is caused by either twinning from the reversible motion of twin boundaries or by stress induced phase transformation with the latter being the most significant in connection with the present invention. Shape memory alloy actuators are generally based on the different stress-strain curves of the material in its austenitic and martensitic conditions. Nickel titanium and copper based shape memory alloys such as Cu—Zn—Al and Cu—Al—Ni are available. The nickel titanium alloys are often preferred because they have high strength, high electrical resistivity, larger recovery strains, easy workability and excellent corrosion resistance. For superelastic applications, the shape memory alloy may be a binary (near equi-atomic composition) of nickel-titanium, preferably with a nickel content of 49.5% to 51.5% (percent atomic) or a ternary 1 in which a small amount of a third element (preferably less than 10%) is added to nickel titanium such as Ni—Ti—Cu, Ni—Ti—Fe, Ni—Ti—V, Ni—Ti—Co, Ni—Ti—Cr. The copper-based superelastic shape memory alloy can be a Cu—Al—Ni nominally Cu-14.2 Al-4.3 Ni (Wt %), Cu—Zn—Sn of nominally Cu-34.7, Zn-3.0, Sn (Wt %) or Cu—Zn—AL nominally Cu-26.8 Zn-3.8 Al (Wt %). Actuator shape memory alloys are those materials that undergo solid phase transformation by changing the temperature in the material from the lower martensitic phase to the higher austenitic phase. These include Ni—Ti binary alloys with nickel content below 50.8% atomic or Ni—Ti—Cu, Ni—Ti—Fe, Ni—Ti—Mo, Ni—Ti—Ni with the third element composition from 0.5% to 20% copper-based shape memory alloys exhibiting actuation properties include Cu—Zn, Cu—Zn 1-Al$_n$; Cu—Zn—Al—Mn—Cu—Al—Ni—Mn. The iron based shape memory alloys can be Fe—Mn—Si.

Since the general properties of the shape memory alloys are well known from published literature, they will not be described in further detail.

Utilizing the information hereinbefore set forth, the ingot or bar or rod 21 is formed of a shape memory alloy having the desired characteristics and with a recoverable strain in excess of 1.0% and preferably in excess of 1.5%. Thus, the ingot can be formed of a shape memory alloy which has superelastic capabilities or alternatively actuator capabilities.

The shape memory alloy utilized in the ingot or rod 21 for the drawing operation has an ultimate tensile strength ranging from 120 ksi to 300 ksi and a resistivity ranging from approximately 80 to 150 micro—ohm—cm.

Such an ingot can have a suitable diameter as for example ranging from 0.25" to 2.0". The ingot or rod 21 as shown in FIG. 1 has been inserted into a cylindrical bore 22 provided in a cylinder 23 formed of a suitable cladding material as for example copper and having a wall thickness ranging from 0.05". The ingot or rod 21 and cylinder 23 form an assembly 24 in which the ends can be swaged in a conventional manner so that the cylindrical ingot or rod 21 is retained within the bore 22 of the cylinder to provide an assembly 24. The assembly 24 is utilized in conjunction with conventional wire drawing equipment and is drawn down through successive passes. Typically since a shape memory alloy is utilized in the ingot or rod 21, the number of passes between each anneal should be limited to 3–4 passes. The drawing operation is continued until the desired wire size has been achieved to provide a wire 26 having a suitable outside diameter as for example 0.213" with a center core 27 formed of the shape memory material and having a diameter of 0.021" and with cladding 28 extending over the core and having a suitable thickness, as for example 150μ inches, thereby provide a conductive copper cladding for the wire 26. The drawing operation hereinbefore described creates strong adhesion between the core 27 and the cladding 28 and provides a very strong composite material or composite structure in the form of the wire 26. After the wire drawing operation, the resistivity of the shape memory alloy material forming the core which is the major portion of the cross-section can have the same ultimate tensile strength ranging from 120 ksi to 300 ksi. the total resistivity, however, will be very low, ranging from 20 micro-ohm-cm to 4.0 micro-ohm-cm. The cladding 28 can have a surface hardness which is no greater than that shape memory alloy of the core 27 and typically is substantially less than the hardness of the shape memory alloy core 27 and for example would have a Rockwell hardness similar to copper alloys ranging from 40 RB to 60 RB.

For the cladding 28, it should be appreciated that various types of materials can be utilized depending upon the characteristics desired for the end product. If stainless steel is used, it can have a hardness which is similar to that of the core 27. Typically in accordance with certain embodiments of the present invention, the cladding should have a hardness which is no greater than and preferably substantially less than the hardness of the shape memory alloy to substantially reduce the die wear during the wire forming process. To achieve a good conductivity for the cladding 28 which is a conductivity which is substantially above the conductivity of the shape memory alloy core 27, a highly conductive material such as copper, gold, silver, nickel and the like should be utilized. Where other or additional characteristics are designed for the cladding 28 other materials can be utilized as hereinafter described, as for example stainless steel, where good welding capabilities as well as strength are desired. Nickel can also be used as a cladding material were nickel characteristics are desired.

By way of example, if stainless steel is utilized for the cladding, as for example if an ingot 21 having 0.5" can be inserted into a stainless steel tube of an inside diameter of 0.5" and an outside diameter of 0.650" it is possible to draw down the assembly 24 to very small cross sections with three or four drawing passes, each having a reduction in diameter ranging from 7% to 14% for a total of 30%–50% before an inter pass anneal at 700°–850° C. Depending on the final stiffness desired, the cross-sectional area of the core 27 and the cladding 28 can be adjusted by considering the respective moments of inertia of the respective areas as set forth below.

$$I_{\text{(Moment of Inertia of Area of Core 27)}} = \pi \frac{OD^4}{64} \text{(a rod)}$$

$$I_{\text{(Moment of Inertia of Area of Cladding 28)}} = \pi \frac{OD^4 - ID^4}{64} \text{(a cylinder)}$$

It is to be noted that in the case of composite shape memory alloys, the calculated moment of inertia of the actuator section should be slightly higher than the superelastic component. This is because during actuation the material should have extra strength to overcome the strength of the superelastic part in order to bend it.

When the cladding 28 is provided for improved conductivity for the wire 26 the resistivity can be expressed as follows:

$$R = \frac{\frac{\rho_1}{S_1} \times \frac{\rho_2}{S_2} \times (S_1 + S_2)}{\frac{\rho_1}{S_1} + \frac{\rho_2}{S_2}}$$

where
$\rho_1$=resistivity of shape memory alloy
$\rho_2$=resistivity of cladding material
$S_1$=area of a shape memory alloy
$S_2$=area of cladding From the foregoing, it can be seen that the stiffness can be readily calculated with the contribution of the center core 27 and the contribution of the cladding 28 contributing more or less to the stiffness as desired. For example in utilizing nickel titanium alloy as the core 27 and stainless steel as a cladding 28 to provide greater stiffness, it is desirable that the nickel titanium core be of greater proportion of the area because of its modulus of elasticity is lower than that for stainless steel.

In addition to the characteristics desired for the cladding 28 hereinbefore described, cladding can also be provided to improve solderability and welding as well as providing an improved surface for plating. Also, the cladding can be selected in other applications to provide improved radiopacity and improved biocompatibility. For example, such capabilities can be provided with a gold cladding. In addition, the cladding material can be selected to provide improved pushability and torquability when, for example, a guide wire is made of a center core shape memory alloy and an outer stainless steel.

Another assembly incorporating the present invention that can be utilized in a drawing operation is an assembly 31 that consists of a cylindrical rod 32 formed of a first or one shape memory alloy and which is disposed in a bore 32 provided in a cylinder 33 formed of a second or another shape memory alloy. The cylinder 33 is disposed within a bore 34 provided in another cylinder 36 formed of a material to provide the desired characteristics for a cladding. The assembly 31 can be swaged and then the entire assembly subjected to drawing operations of the type hereinbefore described. Two different shape memory alloy materials are utilized for the rod 32 and cylinder 34. In the present invention, one of the shape memory alloys exhibits superelastic characteristics and the other shape memory alloy exhibits actuator characteristics. The positions of the two shape memory alloys in the assembly 31 can be interchanged between the center core forming the rod 32 and the cylinder 34. Thus the rod 32 can be either a shape memory alloy exhibiting superelastic characteristics or a shape memory alloy exhibiting actuator characteristics with the cylinder 34 being formed of a material selected form the other of the two types of shape memory alloys. It should be appreciated that a plurality of layers can be formed by the cladding by the use of a plurality of inter-fitting cylinders. In this way, a plurality of different materials can be used in the cladding. Thus, if desired, three different shape memory alloys can be used. Two can be actuator shape memory alloys and one could be a superelastic shape memory alloy to achieve the desired, characteristics for the end product.

The assembly 31 can be subjected to drawing operations of the type hereinbefore described with respect to the assembly 24 to provide a composite structure 41 in the form of a wire with a center core 42 formed of one shape memory alloy surrounded by a cylindrical sleeve formed of the other shape memory alloy which is surrounded by a cladding or sleeve 44.

Figure 5:
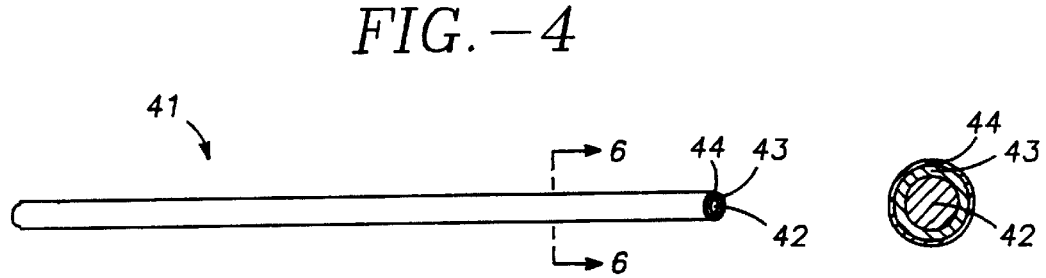
FIG. 5 is an isometric view of a wire formed from the composite assembly shown in FIG. 4 to provide a wire having a composite structure incorporating the present invention.

By way of example, in the composite structure 41 as shown in FIG. 5, the core 42 can have a diameter of 0.005", the sleeve 43 an outside diameter of 0.006" and the cladding 44 having an outside diameter of 0.062" to provide a cladding having a wall thickness of $100\mu$ inches and with the sleeve 43 having a wall thickness of 0.0005".

It can be readily appreciated that the composite structures 26 and 41 can have many diverse uses and applications as for example guide wires in the medical applications such as angioplasty procedure. Guide wires having variable stiffness can also be provided. Other applications include the robotic devices, mechanical devices, valve actuators, flow controllers, thermal relays and the like.

Figure 7:
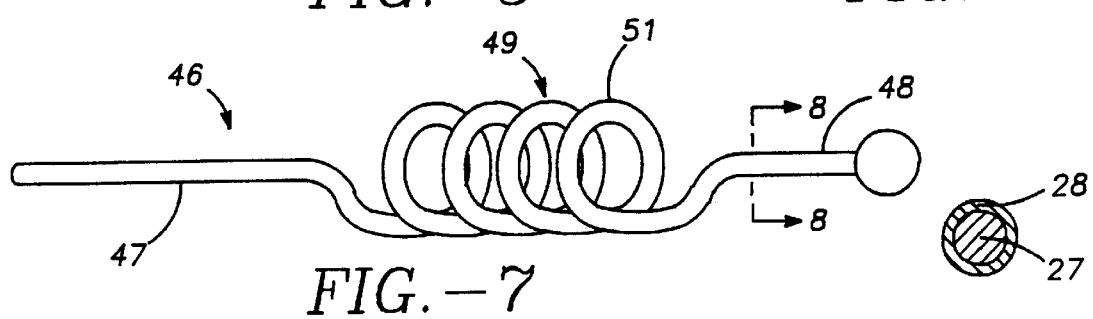
FIG. 7 is an isometric view of an antenna fabricated from a composite structure of the present invention.
Figure 8:
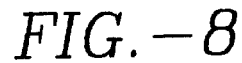
FIG. 8 is an enlarged cross-sectional view taken along the line 8—8 of FIG. 7.

One specific application of the composite structure 26 is shown in FIGS. 7 and 8 and consists of radio frequency antenna of the type which can be utilized in cellular phones. A suitable length of the composite structure 26 is cut off, as for example a length of 8" having a center core 27 formed of a nickel-titanium shape memory alloy having superelastic characteristics and with the core 27 having an outside diameter of 0.021". Copper cladding 28 having an outside diameter of 0.0213" and having a wall thickness of $150\mu$ inches is provided on the center core 27.

The antenna 46 is provided with first and second ends 47 and 48 and a helical coil 49 intermediate the ends 47 and 48 but in closer proximity to the end 48. The helical coil 49 is provided with a plurality of turns 51 as for example three as shown. The turns 51 can have a suitable diameter as for example 0.125" with a suitable spacing between the turns, for example 0.060". The helical coil 49 can be formed in the material of the composite structure in a manner well known to those skilled in the art by bending of the composite structure. The coil 49 can be shape set in a conventional manner as for example a temperature of 500° C. for a period of time ranging from 1–15 minutes.

The copper cladding provided in the superelastic core provides excellent radio frequency propagation and reception characteristics while the core formed of the superelastic material provides excellent anti-destructive characteristics for the radio frequency antenna. Because of the superelastic material, the antenna can withstand sharper bends without breaking or causing permanent deformation so that it will spring back to its original confirmation. Such an antenna will not break or bend and will bounce back to its normal position when released.

Figure 6:
FIG. 6 is a cross-sectional view taken along the line 6—6 of FIG. 5.

In applications of the composite structure 41 shown in FIGS. 5 and 6, the core 42 can be formed of a shape memory alloy having actuator characteristics. These actuator characteristics can be activated by applying heat to the shape memory alloy as for example by applying heat from an external source or by generating the heat internally by passing electrical energy through the shape memory alloy to cause it to achieve the shape set in its memory. When the shape memory alloy cools, the composite structure can be returned to its original shape by the other shape memory alloy having superelastic characteristics forming the sleeve 43. Thus rather than providing a spring back from stainless steel which is approximately only 0.5%, a spring back greater than 7% can be achieved by utilizing the superelastic shape memory alloy. It can be seen that a composite structure can be provided having superior characteristics with respect to spring back. It should be appreciated that the functions of the core 42 and the sleeve 43 can be interchanged. For example, the sleeve 43 can be formed of a shape memory alloy having actuator characteristics and the core 42 can be formed of the shape memory alloy having the superelastic characteristics.

Although the present invention heretofore has been described as being utilized with cylindrical materials, similar results can be achieved by utilizing sheet materials. Thus as shown in FIG. 9, a sheet-like composite structure 61 has been provided. The composite structure 61 consists of a sheet 62 formed of a shape memory alloy having top and bottom surfaces 63 and 64. Cladding in the form of a sheet 76 covers at least a part of one of the surfaces 63 and 64 and as shown covers the entire surface 63.

In use in guide wires, shape memory alloy material can be cladded with stainless steel to provide good torque transmission and good pushability, with the good torque transmission being provided by the shape memory alloy and by the stainless steel, the desired pushability being provided to thereby provide a composite structure having capabilities which are superior to either one alone with respect to torquability and pushability.

As a starting assembly (not shown), the sheets 62 and 66 have a suitable width as for example 1" to 10" and a suitable thickness as for example 0.25" for the shape memory alloy and a thickness ranging from 0.125" to 0.25" for the cladding material of the sheet 66, as for example of stainless steel. The assembly can then be rolled down to the desired thickness by three to four passes between each anneal to provide a final composite structure 61 as shown in FIGS. 9 and 10 in which the composite structure 61 would have a great length and could be slit into appropriate widths and cut into appropriate lengths. For example, a length of five feet could be provided with a width of 0.052" with the composite structure having a thickness of 0.0015" with the sheet memory alloy layer having a thickness of 0.0010" and the cladding layer 66 having a thickness of 0.0005".

The composite sheet structure 61 can then be bent in a conventional manner into a circular form with abutting edges as shown in FIG. 10 with the shape memory alloy layer being enclosed and the cladding layer 66 being outermost. A welded seam 71 joins the abutting edges to form a hypotube 72 having a suitable outside diameter as for example 0.018" and an inside diameter of 0.015". Such a hypotube 72 has many desirable advantages. For example, the stainless steel cladding provides biocompatibility whereas the shape memory alloy having superelastic capabilities provides anti-kinking capabilities when used in guide wires. It should be appreciated in connection with the foregoing that if desired, the other surface 64 of the shape memory alloy sheet 62 can be covered with another sheet 76 which is shown in dotted lines in FIG. 9 and of the same composition and thickness as the sheet 66 so that when the assembly 61 is rolled into the cylindrical form shown in FIG. 10, the interior lumen 77 extending through the tubular member 72 is provided with a biocompatible surface forming the same. Other attributes for the tubular member 72 can be provided. For example, if it is desired that the hypotube carry a conductive layer, this conductive layer can be provided by means of the exterior layer 66 being formed of a conductive material such as copper. Another method of joining is to spiral form the sheet around a mandrel of the desired diameter and welding along the edges of the sheet.

As with the cylindrical embodiments of the composite structure hereinbefore described, the sheet structure shown in FIGS. 9 and 10 also can be provided with layers of first and second shape memory alloys in which one of the shape memory alloys has superelastic characteristics and the other of the shape memory alloys has actuator characteristics.

Thus as shown in FIG. 11, there can be provided a composite structure 81 which consists of two planar sheets 82 and 83 with the sheet 82 being formed of one shape memory alloy and the sheet 83 being formed of another shape memory alloy. The upper surface 84 of the sheet 83 and the bottom surface 86 of the sheet 82 can at least be partially covered by cladding by a sheet 87 covering the surface 84 and a sheet 88 covering the surface 86. Such an assembly of sheets can then be rolled in the manner hereinbefore described to provide the composite structure shown in FIG. 11 in which the sheets are intimately bonded to each other. The sheets then can be slit and cut to the desired length then rolled into a cylinder as shown in FIG. 12 and then welded to provide a longitudinally extending seam 89 to form an elongate tubular member 91 which has a lumen or passageway 92 extending therethrough.

Thus it can be seen that the composite structure 81 can be utilized in sheet form or in circular form. It also be appreciated that other forms can be provided as for example an oval-shaped form if desired. Such composite structure can be utilized for making many devices, particularly where actuator capabilities are desired and it is desired that the composite structure return to its original shape after actuation has been completed.

The device made from a composite structure of the present invention takes the form of a guide wire 101 as shown in FIG. 13. The guide wire 101 consists of a core mandrel 102 which is formed by cladding core wire 103 of a nickel titanium alloy. The core wire 103 is circular in cross section as shown in FIG. 14 and is clad with an outer sleeve 104 of stainless steel.

The core mandrel 102 can have a suitable outside diameter as for example 0.018" or less. The core mandrel 102 can have a suitable length as for example 150 cm or greater. The core mandrel 102 is provided with proximal and distal extremities 106 and 107. The distal extremity 107 is provided with a first tapered conical portion 108 followed by a straight cylindrical portion 109, another tapered conical portion 111 and a straight cylindrical portion 112 as shown in the cross-sectional views. The nickel titanium alloy can be a superelastic nickel titanium alloy. At the first tapered portion 108, it can be seen that the core wire 103 is reduced in diameter and similarly, the stainless steel sleeve 104 is reduced in thickness. As is shown in FIG. 16 in the straight cylindrical portion 109 the stainless steel sleeve has been removed to provide improved flexibility. Thereafter, the cross-sectional area of the nickel titanium core wire is still further reduced as shown in FIG. 17 and still further in the straight cylindrical portion 112 so that it has a diameter ranging from 0.002" to 0.003". A coil 116 of a suitable radiopaque material such as platinum tungsten alloy or palladium is formed from wire having a suitable diameter such as 0.003" to have substantially the same. diameter as the outside diameter of the proximal extremity of the core wire 106. The coil 116 is provided with proximal and distal extremities 117 and 118. It should be appreciated that the coil 116 can be formed of stainless steel. Any of the above materials for the coil 116 can be readily joined to the stainless steel sleeve or jacket 104 provided on the tapered portion 108. This makes it much easier to form a junction and particularly one with a nickel titanium alloy. The flexibility of the distal extremity 107 can be readily adjusted by appropriate adjustment of the ratio of the area of stainless steel to the nickel titanium alloy and also to select the appropriate moment of inertia.

The guide wire 101 can have a suitable outside diameter such as 0.014". Use of the composite structure of the present invention in the guide wire device 101 by providing stainless steel on the exterior which facilitates good solderability of the distal coil 116 to the core mandrel 102. In addition the nickel titanium in the core wire provides flexibility and good torqueability to the guide wire. In addition the inner core of the nickel titanium alloy aids pushability. The removal of the stainless steel sleeve or jacket over the portions of the distal extremity 107 distal of the tapered portion 108 by suitable means such as centerless grinding provides greater flexibility for the distal extremity which is a desirable characteristic in the distal extremity of a guide wire. By providing the inner core of the nickel titanium alloy increased pushability is obtained.

The proximal extremity 117 of the coil 116 is secured to the stainless steel present at the taper 108 by suitable means such as solder 119. The distal extremity 118 of the coil 116 is secured to the distal tip of the straight cylindrical portion 112 by a solder tip 121 which provides a rounded or hemispherical tip for the guide wire 101.

The composite structure which is utilized for making the guide wire 101 can be formed in the manner as hereinbefore described as for example a rod of nickel titanium alloy can be provided in a bore (not shown) in the stainless steel cylinder and the assembly thereafter drawn down until the desired size has been reached. As pointed out previously in order to facilitate the drawing it may be desirable to provide a copper cylinder on the exterior of the stainless steel. After the composite material has been drawn down to the final desired dimension as for example 0.014", the distal extremity 104 with its various tapers and straight portions can be subjected to centerless grinding to provide those portions.

When improved shapeability of the distal extremity of the guide wire 101 is desired, a construction such as shown in FIGS. 14A, 15A, 16A, 17A and FIG. 18A can be utilized. As can be seen from these cross-sectional views, the composite structure which is utilized for making the guide wire is comprised of an inner core 126 of stainless steel as for example stainless steel 304V with an intermediate sleeve 127 surrounding the same formed of a nickel titanium alloy and an outer sleeve 128 also formed of stainless steel such as stainless steel 304V. The composite structure utilized in the embodiment shown in these figures can be manufactured in the manner hereinbefore described by providing an outer cylinder for forming the sleeve 128 and providing another sleeve 127 within a bore provided in the sleeve 128 and then providing a rod 126 of stainless steel within a bore provided in the nickel titanium sleeve 127 and then drawing down this assembly in the manner hereinbefore described to the desired overall wire dimension.

After the drawing operations have been completed, the outer sleeve or layer 128 can be very thin as for example from 0.00025" to 0.00050" or thicker to a thickness as great as 0.007". When the layer 128 is very thin it is mainly provided for improving solderability as for example for adhering the coil 116 to the tapered portion 108 of the solid core wire 103. If greater pushability is desired for the guide wire, a thicker layer of stainless steel can be utilized as for example up to 0.007". Even with the thinner stainless steel outer layer, the stainless steel would be present at the tapered portion 108 to facilitate soldering of the proximal extremity of the coil 116 to the core mandrel 102. The outer stainless steel layer 128 is removed by centerless grinding distal of the tapered portion 108 and then the layer 127 of the nickel titanium alloy is removed distal of the tapered portion 111 as shown in FIG. 18A so that all remains is stainless steel to provide improved solderability for securing the distal extremity 118 of the coil 116 by the use of the solder tip 121 to the straight portion 112 which serves as a safety ribbon.

It should be appreciated that in certain applications it may be possible to utilize an adhesive (not shown) for securing the distal extremity of the straight portion 112. Welding such as TIG welding can be utilized in certain applications. However, it should be appreciated that heat generated by such welding may have undesirable effects on the superelastic properties of the nickel titanium alloy.

From the foregoing it can be seen that various combinations of the composite structure herein disclosed can be utilized for making guide wires of different types having the desired characteristics with respect to flexibility, pushability, shaping capabilities of the tip to provide guide wires having the desired characteristics.

For the cross-sections shown in FIG. 14, the nickel titanium core 103 can have a diameter ranging from 0.00025" to 0.03775" with the stainless steel sleeve having a thickness making up the difference to provide an outside diameter for the core mandrel 102 ranging from 0.010" to 0.038". Conversely if it is desired that the core 103 be formed of stainless steel and the sleeve 104 be formed of nickel titanium, similar dimensions may be used. Similarly, with the construction shown in FIG. 14A, the center stainless steel core 126 can have a suitable diameter as for example 0.00025" and with the outer sleeve 128 having a wall thickness of 0.0025" to 0.005" with an intermediate sleeve of nickel titanium being formed with a thickness so that the overall diameter of the core mandrel 102 ranges from 0.10" to 0.038".

Another embodiment of a device incorporating the composite structure of the present invention is shown in a guide wire 136 in FIG. 19, with the guide wire being characterized as being one in which the distal extremity can be bent and has variable stiffness. The guide wire 136 consists of a core mandrel 137 formed of a core wire 138 of a nickel titanium alloy surrounded by a conductive sleeve 139 formed of a suitable conductive material such as gold, silver or copper. The sleeve 139 is surrounded by a sleeve 141 of stainless steel as for example stainless steel 304V. This composite structure comprised of the core wire 138, the sleeve 139 and the sleeve 141 can be manufactured in the manner hereinbefore described by providing the outer sleeve 141, the inner sleeve 139 and the core 138 in the manner hereinbefore described and using wire drawing and swaging to obtain a desired final diameter as for example 0.014 as hereinbefore described.

The core mandrel mandrel 137 is provided with proximal and distal extremities 143 and 144. The stainless steel on the proximal extremity 143 has been removed by a suitable means such as etching or grinding to provide a proximal extremity in which the conductive layer 139 is exposed as shown in the cross-sectional view in FIG. 20 so that electrical contact can be made therewith. An insulating layer 146 formed of a suitable plastic as for example a polyimide is applied over the stainless steel sleeve 141. The insulating layer 146 extends distally over the tapered portion 147 as shown in FIG. 19 and terminates at the commencement of the straight cylindrical portion 148 of reduced diameter. The insulating layer 146 is covered with a conductive layer 151 as for example by the use of a silver ink or gold ink. A coil 152 of the type hereinbefore described formed of a suitable radiopaque material has its proximal extremity 153 secured over the insulating layer 146 by suitable means such as an adhesive 154 so that its proximal extremity is isolated from the stainless steel sleeve 141. The proximal extremity 153 is electrically connected to the conductive layer 151 by suitable means such as solder 156. The coil 152 is provided with a distal extremity 157 which is secured to the straight portion 148 by a suitable means such as a conductive solder 158 which provides a rounded or hemispherical tip for the guide wire 136. By providing an appropriate connector of a type such as disclosed in U.S. Pat. No. 5,178,159, DC power can be supplied at a suitable voltage as for example 24V to the conductive sleeve 139 where it terminates under the coil 152 and then enters into the straight portion 148 of the core wire 138 and thence into the conductive tip 158 through the coil 152 and thence through the outer conductive layer 151 back to the connector in the DC power supply. As is well known to those skilled in the art, the passing of current through the straight portion 148 of the nickel titanium alloy which is of an actuator type causes the distal extremity to move to a predetermined bend as for example as shown by dotted lines in FIG. 19 so that the guide wire can be utilized for negotiating tortuous vessels of the human patient as for example in the arterial vessels of the heart.

Another device utilizing the composite structure of the present invention is the guide wire 161 shown in FIG. 25 which is provided with a preferential bending plane. The starting materials for the composite structure utilized in the guide wire 161 is shown in FIG. 24 in which a cylindrical bar or rod 162 of the desired nickel titanium alloy is provided. The rod 162 is provided with a plurality of diametrically aligned bores 163 extending therethrough into which rods 164 of a different material such as stainless steel 304V have been inserted. As can be seen, these rods 164 lie in a diametrical plane. The assembly shown in FIG. 24 can then be drawn and swaged in the manner hereinbefore described until the desired diameter is achieved as for example having a range from 0.010" to 0.038" and preferably approximately 0.014". A mandrel 166 is formed from the resulting wire drawn from the rod stock shown in FIG. 24 and which has proximal and distal extremities 167 and 168 (see FIG. 25). The distal extremity 168 can be centerless ground to provide a tapered portion 169, a straight cylindrical portion 171, a further tapered portion 172 and a final straight cylindrical portion 173.

This mandrel 166 can be utilized for making guide wires of the type hereinbefore described primarily by securing a radiopaque coil on the distal extremity 168. As can be seen from the cross-sectional views in FIGS. 26 and 27, the mandrel 166 is comprised of a nickel titanium cylindrical body 176 in which there are a plurality of diametrically aligned cores 177 as for example three as shown in FIGS. 26 and 27 which lie in a plane extending through the center line of the body 176. With such an arrangement it can be seen that there will be preferential bending of the distal extremity of the mandrel 166 in directions which are perpendicular to the plane formed by the cores 176 as for example the plane designated as X—X in FIGS. 26 and 27.

In connection with the mandrel 166, it can be seen that it is only necessary that two different materials having different stiffnesses be utilized to obtain the preferential bending. Thus for example rather than having the cores 177 be of stainless they can be of a nickel titanium alloy with the body 176 formed of stainless steel. Other materials also can be utilized as for example copper and stainless steel in either of the two embodiments hereinbefore described.

Although the composite structure hereinbefore described in connection with FIGS. 24 through 27 has been disclosed as being used as a guide wire, this may not always be particularly desirable where it is desired to torque the guide wire because the preferential bending characteristics of the guide wire may resist rotational movement. Such a composite structure, however, should be very useful in catheters. Also, such a composite structure. having a preferential bending plane wound into coils would provide different stiffnesses depending on the manner in which the coil is wound with the preferential bend material. In order to use the composite material for guide wires it may be desirable to twist the major portion of the length of the guide wire through three or four 360° rotations at a high temperature so that the composite material takes a set and basically becomes a coil with the exception of the distal 2–3 cm which would not be so treated so that the distal extremity would retain the desired preferential bend characteristics.

Another device incorporating the composite structure of the present invention is shown in the guide wire 181 in FIG. 29. The guide wire 131 is formed from a composite assembly structure 182 shown in FIG. 28 which consists of a bar or rod 183 formed of a first material as for example a nickel titanium alloy in which there are provided a plurality of circumferentially arranged spaced-apart bores 184 disposed within the bar or rod 183 and into which have been inserted rods 186 of a second material as for example stainless steel. The assembly 182 is then drawn and swaged in the manner hereinbefore described down to the desired dimension for forming the mandrel 187 of the guide wire 181. The mandrel is provided with proximal and distal extremities 188 and 189. The distal extremity 189 is provided with tapered portions and cylindrical or straight portions in the manner hereinbefore described and as shown there is provided a tapered portion 191 and a straight cylindrical portion 192 and other portions (not shown). As shown, the grinding of the tapered portion 191 exposes the circumferentially arranged cores 193 disposed within the body 194. Since these cores 193 are formed of stainless steel, it makes it possible to readily bend the proximal extremity 196 of a coil 197 formed of stainless steel or other more radiopaque material such as platinum tungsten alloys or palladium. By providing circumferentially disposed spaced-apart stainless steel cores as shown particularly in FIG. 30, excellent torque transmission characteristics are provided so that the proximal and distal extremities 188 and 189 of the mandrel will have substantially one to one rotation between them.

Although the construction as shown in FIG. 30 is described for use as guide wires, it is readily apparent that such a composite construction can also be readily utilized in other applications where good torque transmission is required. As discussed in connection with the previous embodiments, the construction shown in FIG. 30 need not be limited to stainless steel and nickel titanium alloys. The materials can be reversed in locations and other materials can be utilized. In addition it should be appreciated that improved pushability and stiffness can also be obtained with such a construction in addition to the torque transmitting capabilities provided.

Another composite assembly incorporating the present invention is shown in the composite structure 201 in FIG. 31 in which cylindrical bar stock 202 formed of a suitable material such as a nickel titanium alloy is utilized, A central bore 203 is provided in the cylinder 202 which is honed to a mirror finish into which there is inserted a rod 204 of a suitable material such as low carbon steel which has its exterior surface also honed to a mirror finish. In addition there is provided a plurality of circumferentially spaced-apart bores 206 disposed within the body between the bore 203 and the outer surface of the body. Rods of a suitable material such as stainless steel 207 are inserted into the bores 206. The entire composite assembly shown in FIG. 31 can then be drawn down in the manner hereinbefore described until the desired wire size is achieved as for example from 0.030" to 0.010" and preferably approximately 0.014".

After the draw down operation has been completed, the drawn down wire is cut off to appropriate lengths after which each length is stretched and particularly by stretching the stainless steel the rod 207 permitting the body 202 to change its dimensions and to increase the size of the central bore 203 to permit the low carbon steel rod 204 to drop out or be able to be pulled out so as to leave a mandrel 208. The low carbon steel rod 204 can be readily withdrawn after the composite structure 201 shown in FIG. 31 has been drawn down because of the honed surfaces provided on the low carbon steel rod 204 and the honed mirror-like surface provided for the bore 203. Such a mandrel as shown in FIGS. 32 and 33 has a cylindrical body 209 having a central lumen 211 therein and having a plurality of circumferentially disposed cores 212 of stainless steel surrounding the lumen 211. The mandrel 208 shown in FIG. 32 can be utilized as a torque tube in guide wires and other elongate tubular members. Because of the arrangement of the circumferentially spaced-apart stainless steel cores 212, a very good torque transmission is provided. The stainless steel cores also provide increased pushability. The use of the nickel titanium alloy for the body 209 provides kink resistance while still providing flexibility. If radiopacity is desired, certain of the cores 212 can be formed of a radiopaque material. The mandrel 208 formed of such construction as shown in FIG. 32 is provided with proximal and distal extremities 213 and 214 in which the distal extremity 214 can be centerless ground to provide the various configurations of the type hereinbefore described.

In connection with the embodiment of the invention shown in FIGS. 31, 32 and 33 it should be appreciated that different materials can be utilized. For example, the positions of the nickel titanium alloy and the stainless steel can be reversed. Alternatively copper, platinum and gold can be substituted for the stainless steel cores 212.

In FIG. 34, there is shown a multi-lumen mandrel 216 which is provided with a body 217 of a suitable material such as nickel titanium or aluminum and which is provided with a plurality of lumens as for example a large lumen 218 and a smaller lumen 219 disposed above the larger lumen and two side lumens 221 and 222 which are disposed generally at right angles to the lumens 218 and 29. Such a multi-lumen mandrel or hypotube 216 can be fabricated utilizing the approach shown in FIG. 31. Thus a cylindrical body or bar can be taken of the desired material as for example nickel titanium and provided with bores corresponding to the lumens 218, 219, 221 and 222 shown in FIG. 34. These bores can be honed to a mirror finish after which rods of low carbon steel which also have their outer surfaces polished to a mirrored finish are provided in the holes after which the composite assembly can be drawn down to provide a wire of the desired size after which the wire can be cut to lengths and then stretched to remove the low carbon steel inserts so there remains the lumens 218, 219, 221 and 222 hereinbefore described. such a multi-lumen mandrel can be utilized in many applications as for example as a cannula for drug delivery. Such a mandrel has distinct advantages over a plastic tubular member having passages therein in that it has greater pushability and torquability. For example mandrels constructed of this material can be utilized in balloon catheters to provide increased capabilities while providing a capability for drug delivery and a lumen for inflating and deflating the balloon of the balloon catheter.

In accordance with the present invention it should be appreciated that the composite technology herein disclosed can be utilized for forming wire used in making coils. Platinum clad stainless steel core wire can be utilized to provide the springiness desired and the desired radiopacity. For example, the distalmost extremity of the coil so formed can be formed of pure platinum or a platinum tungsten alloy or similar radiopaque material with the remainder of the coil being formed of platinum clad stainless steel wire. The overall diameter of the wire utilized for such coil typically would be in the range of 0.003". The thickness of the cladding utilized would be determined by the radiopacity desired but various thicknesses ranging from 0.001" can be utilized.

In connection with nickel titanium alloys, it has been found that it is very difficult to provide thin sheets of nickel titanium alloys particularly with thicknesses less than 7 to 8 mils. In connection with the composite structures hereinbefore described it has been found that such composite structures can be utilized for providing such thin sheets of nickel titanium alloys. Thus as shown in FIG. 35 a cylinder 223 formed of copper is provided with a central bore 224 in which there is mounted a rod 225 of nickel titanium alloy of which it is wished to make thin sheets. The cylindrical composite assembly 219 is then rolled in successive passes until the nickel titanium rod 225 has been reduced to a desired thickness as for example less than 8 mils and preferably a thickness of approximately 5 mils to provide a flat rolled stock 226 as shown in FIG. 36. Thereafter as shown in FIG. 37, the outer copper layer 221 is sacrificed by etching it away in a suitable acidic solution to provide the flat sheet stock 227. The sheet stock 227 can be characterized in that even though it is very thin it has smooth surfaces with uniform edges.

In FIG. 38 there is shown another composite structure 231 in which a copper cylinder 232 is provided having a central bore 233 which has disposed therein a nickel titanium rod 234 which is covered by a sleeve 236 of gold. This composite structure 231 shown in FIG. 38 is rolled flat as shown in FIG. 39 to provide a rolled stock 237 which includes a nickel titanium sheet 238 which has been rolled to the desired thickness and width covered by a thin layer of gold 236. The outer copper layer is again sacrificed in a conventional manner so that there remains sheet stock 238 as shown in FIG. 40 in which the nickel titanium sheet is provided with a layer of gold to provide a layer giving good conductivity while retaining the desirable characteristics of the nickel titanium alloy. It should be appreciated that other sacrificial materials can be utilized in the composite structure. However, it is important that the sacrificial material be relatively inexpensive.

Still another composite structure 241 incorporating the present invention is shown in FIG. 41 in which bar stock of a nickel titanium alloy is provided. The composite structure 241 consists of a bar 242 which is provided with a rectangular bore 243 extending therethrough and into which there has been inserted a nickel titanium bar 244. The composite assembly is then rolled. The resulting flat stock 246 has therein nickel titanium alloy in sheet form of the desired thickness and width. The outer copper layer can thereafter be sacrificed to leave the sheet stock 247 shown in FIG. 43. The rectangular form shown in FIG. 41 for the composite structure makes it possible to obtain a wider strip for the sheet stock 247.

The gold layer 236 provided on the nickel titanium sheet 234 improves the compatibility of the sheet by making it adhere to other materials more easily. In addition, it improves the radiopacity of the sheet 234. This is particularly important when the sheet material is utilized in making medical devices which are introduced into the human body.

The sheet stock material 227 in FIG. 37, 238 in FIG. 40 and 247 in FIG. 43 typically can be produced in a width ranging from 8 to 12" and with the sheet stock material having a suitable thickness as for example 0.005". The sacrificial material which has been removed typically in the flattened condition as shown in FIGS. 36, 39 and 42 would typically have a thickness on each side of 0.015". This sacrificial material is removed by a suitable etch depending upon the sacrificial material utilized by the use of nitric acid, sulfuric acid and the like. Thereafter, the sheet material can be stamped into desired shapes or slit to various widths with the sheets having thicknesses of approximately 0.005" but thicknesses ranging from 0.002" to 0.006". It can be readily produced utilizing the method hereinbefore described. The strip material can be heat treated to obtain the desired characteristics for the nickel titanium alloy. The surfaces on the strip material produced by this method can be characterized as being oxide free, free of pits and cracks and having a surface roughness which is less than or equal to 16 microinches.

If desired, the heat treatment can be performed before the sacrificial cladding has been removed to eliminate any effects which may have been created by the cold working occurring during rolling of the composite materials to achieve the flat stock hereinbefore described. Such annealing successfully would have to take place at temperatures below the melting temperature of the sacrificial material. Typically full anneals can be accomplished at between 700 to 800° C. and even as low as 500 to 550° C., which would be below the melting temperature of copper.

It should be appreciated that the same method can be utilized for making thin walled short tubes. Thus as shown in FIG. 44 there is shown a composite structure or assembly 261. The composite structure 261 consists of a cylinder 262 of a suitable sacrificial material such as copper which is provided with a bore 263 and into which there is mounted a rod 264 of the desired end material as for example a nickel titanium alloy. This rod 264 is provided with a bore 266 in which a rod 267 of a sacrificial material such as copper is provided. This composite assembly is drawn down until the cylinder or sleeve of nickel titanium alloy is drawn down to the desired dimensions as for example from 0.038" to 0.010". Thereafter, the drawn wire can be cut into suitable lengths or wire pieces ranging from approximately 6" and less. These wire pieces are then placed in a etching solution of a suitable type as for example nitric acid to etch out the copper from the interior and to remove the exterior copper of the nickel titanium sleeve so that there remains as shown in FIG. 45 a thin walled short tube 271 having a central bore 272 therein to provide a wall thickness of 0.006" or less and preferably approximately 0.005". Such a tube has oxide free outer and inner surfaces which are free of pits and cracks and has a surface roughness of less than or equal to 16 microinches. This etching operation can take place in a suitable period of time as for example 10 to 15 minutes at room temperature when the drawn down wire has been cut to lengths of 6" or less.

Even thinner wall thicknesses can be achieved by taking the tube 271 as shown in FIG. 45 and inserting a deflated balloon (not shown) into the bore 272 and inflating the balloon to stretch the tube 271 uniformly around its circumference to bring the wall thickness down to the desired wall thickness as for example down to 0.002". Alternatively, a tube can be provided having an even thicker wall thickness as for example 0.1" and then utilizing a balloon to expand the tube to bring the tube down to a desired wall thickness as for example 0.005".

Another composite structure 276 incorporating the present invention is shown in FIG. 46 in which there is provided a cylinder 277 of copper having a central bore 278 in which there is mounted a rod 279 of a desired material for the tube as for example a rod of a selected nickel titanium alloy. The rod 279 is provided with a bore 281 in which there is inserted a rod 282 of sacrificial material as for example copper. The rod 282 is provided with a bore 283 in which there is provided a rod 284 of a suitable nonsacrificial material such as stainless steel. The composite assembly 276 is then drawn down to the appropriate wire size which typically is determined by the final outside diameter of the nickel titanium tube to be formed therefrom. After the drawn wire has been produced, it can be cut in appropriate lengths as for example 6" or less and then placed in a nitric acid bath at room temperature. The removal of the sacrificial material by the nitric acid bath is expedited because less copper need be removed from the interior of the tube which is formed therefrom because after the copper surrounding the stainless steel has been etched out, the stainless steel rod therein can be slipped out to provide a tube of the type as shown in FIG. 44 in which a central bore is provided. The surface of the tube has the same desirable characteristics as for example oxide free, free of pits and cracks and having a surface roughness equal to or less than 16 microinches. As explained previously, a tube formed in this manner can also have its wall thickness still further reduced by a balloon inflation as hereinbefore described.

Another composite structure 291 incorporating the present invention is shown in FIG. 47 which can be utilized for producing a wire to be utilized in making radiopaque spring-like coils typically used on the distal extremities of guide wires. The composite structure 291 consists of a rod 292 formed of a material having the desired radiopacity as for example gold which is provided with a central bore 293 in which there is mounted a rod 294 having the desired spring characteristics as for example a rod of stainless steel 304V. This is drawn down to provide a wire of the desired outside diameter as for example 0.003" or less to provide a clad wire 296 of the type shown in FIG. 48 in which the wire has an outside diameter of 0.003" having a central core 297 of stainless steel as for example having a diameter of 0.002" and having a cladding 298 of the radiopaque material as for example gold having a wall thickness of 0.0005" to provide a total thickness of 0.001" for x-rays to penetrate to make the wire visible under x-rays. This clad wire 296 can be utilized for forming the flexible coils typically provided on the distal extremities of guide wires to provide the desired radiopacity, eliminating the need for soldering platinum tungsten alloys or palladium coils to stainless steel coils as typically has been done in the past. By providing such a clad wire 296 it is possible to make the entire coil on the distal extremity of the guide wire of this material to provide the desired radiopacity.

Another composite structure incorporating the present invention is as shown in FIGS. 49 and 50 which shows rather than providing the radiopaque material as for example gold or platinum on the exterior of a stainless steel core, the materials can be reversed with the radiopaque material being provided in the core and the stainless steel being utilized for the cladding. Thus as shown in FIG. 49 there is shown a composite structure 301. A starting composite assembly (not shown) similar to those hereinbefore described would be provided having a cylinder of steel (not shown) and having a bore therein in which there is placed a rod of the radiopaque material as for example platinum or gold. The assembly is drawn down to provide a wire having the composite structure 301 shown in FIG. 49 in which there is provided a cylindrical core 302 of the radiopaque material such as platinum or gold having a diameter of 0.001" and cladding 303 of stainless steel having a wall thickness of 0.001" to provide a total diameter of 0.003", which wire can be utilized for making radiopaque coils for the distal extremities of guide wires as hereinbefore described. Although specific dimensions have been given for the composite wire structure 301, various wire sizes can be provided utilizing the concept. Typically, the stainless steel cladding should have a thickness ranging from one-quarter to one-tenth of the diameter of the wire, making it possible to select the stiffness and springiness of the wire while still retaining the desired radiopacity. Because the stainless steel is provided on the exterior, the greater stiffness and springiness is achieved over the springiness and stiffness which can be achieved when the stainless steel is the core and the cladding is the radiopaque material. The radiopacity would be basically the same because the same thickness of radiopaque material would be traversed by the X-rays. By way of example, the stiffness with the stainless steel cladding on the outside rather than having it as a central core would be approximately 10 times greater than when the stainless steel is in the core.

Another composite structure 306 is shown in FIG. 50 which utilizes the same principles hereinbefore disclosed for FIG. 49 in which a flat ribbon can be obtained for providing radiopaque coils used on the distal extremities of guide wires with the turns of the coil being formed from the ribbon rather than from the wire 301 having a circular cross-section shown in FIG. 49. Thus the composite structure 306 consists of a core 307 formed of a radiopaque material such as platinum or gold and with stainless steel cladding 308. Such a composite structure can be readily achieved by utilizing a cylindrical structure in which a stainless steel cylinder is provided with a bore and a rod of the radiopaque material such as platinum or gold is inserted therein and then rolling the same to provide the composite structure 306 shown in FIG. 50. The composite structure can have an overall thickness ranging from 0.001" to 0.005" inches and a width ranging from 0.003" to 0.007". By way of example, the cladding 308 could have a thickness of 0.002" with the core having a thickness of 0.001" to provide a total thickness of 0.005" to provide the desired radiopacity and also to provide the desired stiffness hereinbefore described.

In connection with the production of composite construction incorporating the present invention and in particular composite wires which are comprised of superelastic materials such as nickel titanium alloys and high strength layers as for example stainless steel, there is a difficulty in obtaining the desired characteristics for both materials which require cold working. For example nickel titanium alloys are generally cold worked to around 40% to achieve the optimum superelastic characteristics or shape memory effect or effects, whereas stainless steel is typically cold worked to approximately 90% to achieve optimum strength and elasticity. These different cold working parameters pose difficulties when composites of these two materials are utilized. The present invention envisions a process or method for processing of such composites while still optimizing the properties of each nickel titanium and stainless steel. To accomplish this aspect of the present invention, a composite structure 311 such as shown in FIG. 51 is utilized in which a cylinder 312 is provided of the nickel titanium alloy to be utilized having a bore 313 into which there has been inserted a rod 314 of a high strength material such as stainless steel, MP35N™ or Elgiloy™. By way of example, the composite structure 311 shown in FIG. 51 can have an overall outside diameter of 0.20" with the core 314 of the high strength material having a diameter of 0.10". The composite structure 311 can be reduced in size by multiple passes as for example three passes until a 40% reduction has been achieved in the overall area to provide the composite structure 316 shown in FIG. 52 in which the center core 317 has been reduced in diameter to approximately 0.0775" and the outside diameter of the nickel titanium cladding 318 has been reduced to 0.155. The composite structure 316 is then subjected to an interpass anneal in a temperature range which is near 600° C. that is high enough to soften the nickel titanium alloy permitting further reduction but low enough so as to not recrystallize the strength core 317. Thereafter the composite structure 316 is subjected to multiple wire drawing passes as for example three to provide another 40% reduction in size of the core 317 and the cladding 318 to provide the composite structure 321 as shown in FIG. 53 in which the core 322 of high strength material has been reduced in diameter to 0.060" and the cladding 323 has been reduced to an outside diameter of 0.0120". The composite structure 321 is again subjected to another interpass anneal in the temperature range of near 600° C. which is followed by a multiple pass as for example three-pass wire drawing operation to provide the composite structure having a 40% reduction in area by work hardening to produce the composite structure 326 having a high strength core 327 of a diameter of 0.0465" and having the cladding 328 having an outside diameter of 0.093". The resulting composite material 326 would have nickel titanium alloy forming the cladding 328 cold worked to a 40% reduction to achieve the optimum desirable properties for the nickel titanium alloy, whereas the high strength material utilized for the core 327 would have a cold worked reduction in area of at least 78% to achieve the optimum strength and elasticity for that material due to the fact that the annealing temperature is below the recrystallization temperature of the core material. From the foregoing it can be seen that by utilizing appropriate interpass anneal temperatures it is possible to provide the optimum cold working to achieve the desired characteristics for both materials utilized in the composite structure.

When high strength alloys are utilized other than stainless steel for the core, such as the nickel-cobalt-chromium-molybdenum alloys such as Elgiloy(υ) or MP35N(υ), these elements can be cold worked and age hardened in the same manner as the nickel titanium alloy contrary to when a stainless steel alloy is used. Thus a composite structure which is comprised of a nickel titanium alloy and an appropriate nickel-cobalt-chromium-molybdenum alloy can be cold worked to 45% and then heat treated at a temperature as for example 538° C. to simultaneously shape set the nickel titanium alloy component and age harden the high strength alloys.

From the foregoing, it can be seen that composite structures can be provided in accordance with the present* method relatively inexpensively and with substantially reduced die wear and with the desired surface properties. The cost of fabricating the same can be greatly reduced. For example, hypotubes can be provided which have very small outside diameters and small wall thicknesses and still have the desired pushability and torquability. The desired thicknesses can be readily ascertained utilizing standard equations for strength of materials to choose between the shape memory alloys and the cladding. The cladding can be chosen to provide the desired properties for the final composite structure in addition to providing a material which facilitates formation of the shape memory alloys to greatly reduce the cost of forming such memory alloys. It should be appreciated that after the composite material has been formed, and it is desired not to have the cladding on any of the surfaces, the cladding can be removed by appropriate techniques such as chemical etching. For example, a copper cladding layer can be removed by a nitric acid etch.

Also in accordance with the present invention, it can be seen that the cladding can be comprised of a plurality of layers of different materials with the different materials including superelastic and actuator shape memory alloys. For example, two different compositions of actuator shape memory alloys can be used in conjunction with a superelastic shape memory alloy to provide various characteristics for devices made therefrom.

Numerous devices can be made from the composite structures hereinbefore described. For example composite structures particularly lend themselves to the manufacture of guide wires utilized in medical procedures with respect to the mandrels utilized in the guide wires and also for the flexible coils carried at the tips of those guide wires. Composite structures can also be utilized with guide wires having electrical characteristics as for example those guide wires in which it is possible to adjust the stiffness for adjusting the bends at the distal extremities. Preferential bending planes can be readily achieved. Improved torsion capabilities can be provided. Multiple lumens can be provided. Sheet and tube material formed of nickel titanium alloys can be provided which have smooth unblemished surfaces. Cold working to achieve the optimum characteristics for the materials utilized in the composite structures can be obtained by use of appropriate annealing temperatures.

What is claimed is:

1. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, the distal extremity having at least one tapered portion and a portion of uniform diameter extending distally of the tapered portion, the cladding extending over at least a portion of the tapered portion, the portion of uniform diameter being free of the cladding to provide greater flexibility for the distal extremity.

2. A composite structure as in claim 1 wherein said body is formed of stainless steel and further including a sleeve formed of a nickel-titanium alloy disposed between the core mandrel and the stainless steel sleeve.

3. A composite structure as in claim 1 wherein said cladding is formed of a nickel-titanium alloy.

4. A composite structure as in claim 1 wherein said nickel-titanium alloy has been work hardened to approximately 40% and wherein the stainless steel has been work hardened to in excess of 90%.

5. A composite structure as in claim 1 wherein said body is formed of a nickel-titanium alloy and wherein the core mandrel is provided with a plurality of longitudinally extending bores extending diametrically of the body and rods of a different material than the nickel-titanium alloy disposed in the bores to provide additional stiffness to the body and to provide preferential bending in a plane perpendicular to the diametrically extending bores with the rods therein.

6. A composite structure as in claim 1 wherein said body is formed of a nickel-titanium alloy and wherein said body is provided with a plurality of longitudinally extending bores, said bores being arranged circumferentially in the core mandrel, and a plurality of rods of a material different from the nickel-titanium alloy disposed in the bores to provide increased torquability for the body.

7. A composite structure as in claim 6 wherein the rods are provided with distal extremities and wherein the distal extremities extend through the taper of the body.

8. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, said cladding being comprised of multiple layers formed of different materials, one of the materials being a superelastic shape memory alloy and another of the materials being an actuator shape memory alloy.

9. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, said cladding being comprised of multiple layers formed of different materials, at least two of the materials being actuator shape memory alloys.

10. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, said body being comprised of first and second shape memory alloys, the first shape memory alloy having superelastic characteristics and the second shape memory alloy having actuation characteristics.

11. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, at least one of said materials being a nickel titanium alloy, said cladding being formed of a nickel titanium alloy.

12. A composite structure as in claim 11 further including a layer of conductive material adherent to said cladding.

13. A composite structure as in claim 12 together with a layer of insulating material overlying the layer of conductive material and a layer of conductive material overlying the layer of insulating material.

14. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, said body being comprised of a plurality of cores of one material which are arranged to lie in a plane, said cladding covering said plurality of cores, said body being formed of a nickel titanium alloy and said cores being formed of a material having a different rigidity from that of the nickel titanium alloy.

15. A composite structure as in claim 14 wherein said plurality of cores are formed of stainless steel.

16. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, said body being formed of a plurality of circumferentially spaced apart cores, said cores being covered by said cladding, said cores being formed of stainless steel.

17. A composite structure comprising a body which is circular in cross section and which has proximal and distal extremities, said body having a surface and cladding covering at least a part of said surface of the body and being in intimate contact with the surface, said body and said cladding being formed of different materials, said cladding extending from the proximal extremity toward the distal extremity with a portion of the distal extremity being free of cladding, said shape memory alloy having an electrical resistance, said cladding having an electrical resistance which is substantially less than the electrical resistance of the shape memory alloy, said cladding being comprised of a material selected from the group consisting of copper, silver and gold.

\* \* \* \* \*